United States Patent [19]

von Alpen et al.

[11] 4,448,860

[45] May 15, 1984

[54] GALVANIC ELEMENT WITH INTEGRAL GETTER

[75] Inventors: Ulrich von Alpen, Schlossborn; Subash C. Nijhawan, Kronberg, both of Fed. Rep. of Germany

[73] Assignee: Varta Batterie Aktiengesellschaft, Hanover, Fed. Rep. of Germany

[21] Appl. No.: 412,948

[22] Filed: Aug. 30, 1982

[30] Foreign Application Priority Data

Sep. 15, 1981 [DE] Fed. Rep. of Germany ....... 3136578

[51] Int. Cl.$^3$ ............................................. H01M 10/34
[52] U.S. Cl. ...................... 429/57; 429/171; 429/174; 429/185
[58] Field of Search ................ 429/57, 194, 197, 191, 429/58-60, 171-174, 185

[56] References Cited

U.S. PATENT DOCUMENTS

| | | | |
|---|---|---|---|
| 4,128,705 | 12/1978 | Winsel | 429/171 |
| 4,148,976 | 4/1979 | Sekido et al. | 429/191 |
| 4,192,908 | 3/1980 | Himy | 429/58 X |
| 4,220,694 | 9/1980 | Yetani et al. | 429/172 |
| 4,224,384 | 9/1980 | Kozawa et al. | 429/57 |
| 4,287,269 | 9/1981 | Coetzer et al. | 429/194 X |
| 4,288,505 | 9/1981 | Joshi et al. | 429/191 |
| 4,350,745 | 9/1982 | Parsen et al. | 429/57 |

*Primary Examiner*—Charles F. LeFevour
*Attorney, Agent, or Firm*—Weiser, Stapler & Kimmelman

[57] ABSTRACT

Non-aqueous alkaline cells, particularly those with Li anodes, are effectively protected against oxidation or carbonization due to inwardly diffusing moisture by providing them with a getter material of high specific adsorbtivity for gases. For this, there are particularly useful molecular sieves of the Zeolite type, of highly active aluminum oxide, or of silica gel. For retaining the getter, there can be used as receptor media the porous separator or the solid cathode material, and if appropriate also the solid electrolyte. In addition, the getter material can form an extrudable or injectable composite polymer with the plastic of a conventional housing seal, which functions as a water vapor barrier right in the sealing region.

7 Claims, No Drawings

GALVANIC ELEMENT WITH INTEGRAL GETTER

The invention relates to a galvanic element having a solid negative alkali metal electrode, a non-aqueous electrolyte, and a solid positive electrode, within a sealed metal housing.

Among the elements which can be considered as part of the above-defined category, there are particularly included all the lithium cells operating at room temperature. These, in combination with numerous new cathode depolarizers, currently point the way for the further development of electro-chemical current sources due to their high energy. However, the reactivity of the alkali metals generally permits only the use of non-aqueous electrolyte systems. To the more conventional liquid electrolyte based on organic solvents, there have recently also been added a few solid electrolytes in alkaline cells which are characterized by having good $Li^+$ or $Na^+$ ion conductivity, even at room temperature. The ready produceability of electro-chemical solid cells having only solid active components in a sandwich arrangement has also extra-ordinarily favored their miniaturization for important areas of application, e.g. for electronic wrist watches.

Of course, a specific danger always remains associated with the operation of alkaline cells: their susceptibility to in-flowing ambient oxygen, $CO_2$, or even inwardly diffusing water. In view of the fact that an alkali metal reacts with these gases to form oxide, oxihydrate or carbonate, the cell becomes passivated, its internal resistance assumes a high ohmic value, and its current load capacity decreases. In addition, the alkali metal electrode loses capacity.

An effective remedy has been achieved heretofore only by means of special glass-metal seals for the cell housing, or with ceramic-metal lead throughs. However, these are difficult to implement and expensive.

Ordinarily the components of metal housings, e.g. for button cells, are sealed with a thermoplastic synthetic material such as polyethylene or polypropylene. This has such high inherent porosity that permeation by gases or vapors over extended periods of time cannot be ruled out.

Accordingly, it is the object of the invention to provide a galvanic element of the general category initially described, which is protected against the danger of corrosion of the alkali metal electrode, particularly due to moisture penetrating from the outside.

This object as well as others which will appear is achieved in accordance with the invention by providing it with a gas absorbing getter material of high specific surface area.

The invention is based upon the recognition that substances, which are known in themselves, and which are used as so-called getters because of their adsorbtivity for gases are capable of taking up as much as about 40% of their own weight in water, thereby increasing their volume. For small-pore adsorbers, there can currently be obtained specific surface areas up to 750 $m^2/g$. As the getter material with the desired properties, there can preferably be used silica gel, aluminum oxide, or the Zeolites which belong to the category of the so-called aluminosilicates. The latter, particularly, distinguish themselves by the property of storing water molecules in hollow channels within their crystalline grids which extend parallel to the silica chains and by again yielding these upon heating. This behavior is used for "molecular sieves".

The adsorbents mentioned are chemically inactive in relation to the active substances which are used in alkaline cells, including their electrolyte.

Therefore it is particularly preferred, in accordance with the invention, to embed the getter material in the active mass of the positive electrode when the non-aqueous electrolyte is a liquid. In that case, the preferred electrolytes are solutions of an alkali salt such as $LiClO_4$, $LiAsF_6$, or $LiAlCl_4$ in organic solvents such as propylene carbonate, dimethoxy ethane, tetrahydrofuran, and so forth, as well as appropriate mixtures thereof.

Among the useable reduceable substances of the positive electrode, those such as $Bi_2O_3$, $FeS_2$ or $BiPbO_n$, which yield 1.5 volt cells with Li, are to be distinguished from others such as for example $MnO_2$ or $CF_6$, which provides 3 volt systems with Li.

Instead of within the positive electrode material, the getter material can also be located within the separator, which is always present in cells with liquid electrolytes. If the cell is a solid one with a solid electrolyte, which may consist for example of ion conducting $Li_3N$, $LiI$, $Na$-$\beta$-alumina, or a mixed crystal of the quaternary system $N_2O$—$ZrO_2$—$P_2O_5$—$SiO_2$, possibly in the combination $Na_{2.94}Zr_{1.54}Si_{2.2}P_{0.8}O_{10.53}$, then in accordance with the invention it is also possible to place the getter material within this solid electrolyte or within the solid electrolyte separator. The getter is then mixed with the powdered electrolyte material and pressed together with same. A further particularly preferred embodiment of the invention makes use of the possibility of extruding a thermoplastic synthetic material such as polypropylene together with additives. In lieu of known additives such as carbon fibers or glass fibers, there is added in accordance with the invention to the polypropylene or other suitable polymer which is to be used as sealing material, a getter material in predetermined quantity, so that a composite polymer is formed after extrusion. This can then be inserted in suitable format into the closure opening of the cell housing, or it can be injection-molded around it as a seal.

Water vapor, which diffuses in from the outside is then captured by the adsorbent, the getter material swells and seals the synthetic region which is interpenetrated by the particles of adsorbent. The water which has once been stored in the getter remains irreversibly trapped in it because its liberation which require temperatures which are not reached during operation of the cell. As a result of this synthetic plastic sealing the water diffusion is completely inhibited. The composite polymer embodying the invention thus creates a self-sealing medium, and is particularly effective when the ambient humidity is high.

Lithium is preferably used as the negative electrode material in the galvanic element embodying the invention. It is also within the scope of the invention to introduce the getter in the negative electrode.

We claim:

1. In a galvanic element having a solid negative alkali metal electrode, a non-aqueous electrolyte and a solid positive electrode within a sealed metal housing, the improvement which comprises said housing being sealed with a seal-sealing composite polymer comprising a thermoplastic synthetic material and a gas absorbing getter material.

2. The galvanic element of claim 1 wherein said thermoplastic synthetic material is polypropylene.

3. The galvanic element of claim 1 in which the getter material is a zeolite.

4. The galvanic element of claim 1 in which the getter material is aluminum oxide.

5. The galvanic element of claim 1 in which the getter material is silica gel.

6. The galvanic element of claim 1 in which said composite polymer is formed by extrusion.

7. The galvanic element of claim 1 wherein said composite polymer is injection-molded around the closure opening of the cell-housing so as to form a seal.

* * * * *